No. 846,457. PATENTED MAR. 12, 1907.
H. J. DOHRER.
BRAKE.
APPLICATION FILED APR. 30, 1906.
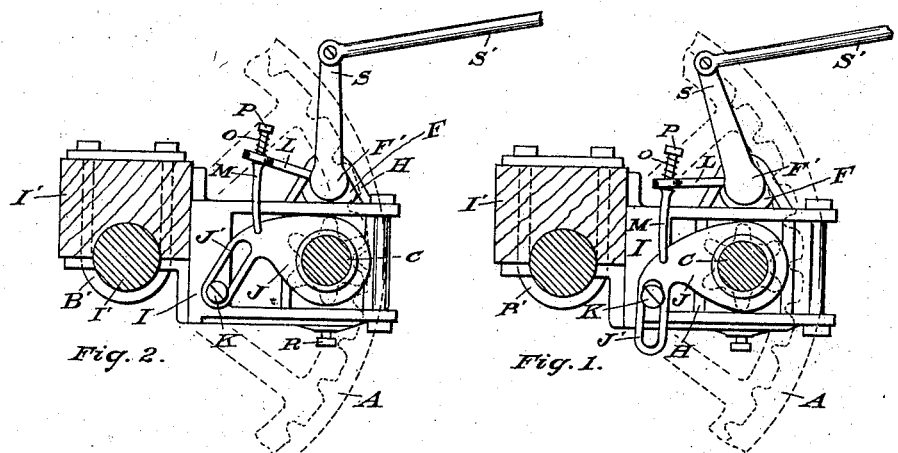
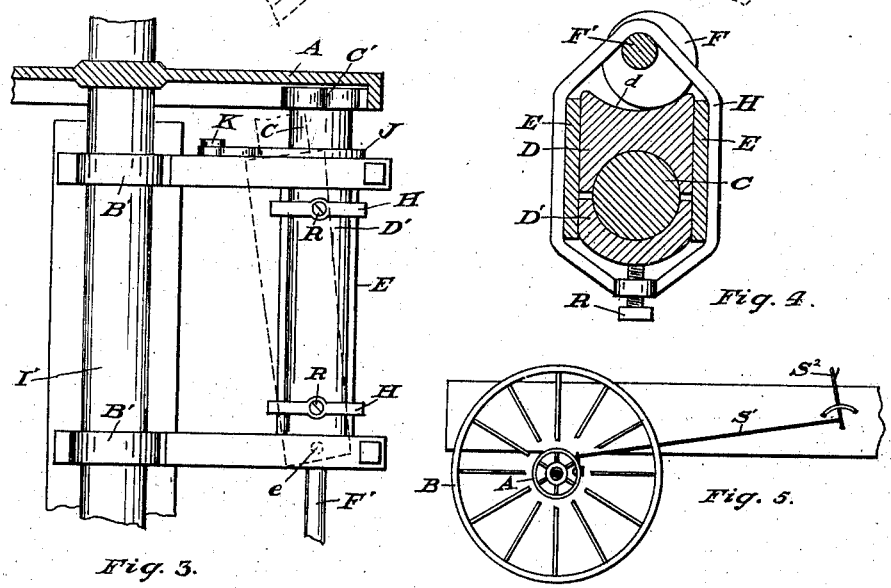
WITNESSES:
INVENTOR:
Henry J. Dohrer
BY Eugene Ayres
ATTORNEY.

UNITED STATES PATENT OFFICE.

HENRY J. DOHRER, OF ST. JOSEPH, MISSOURI, ASSIGNOR OF ONE-THIRD TO JOSEPH W. DOHRER AND ONE-THIRD TO DAVID E. CURTIN, BOTH OF ST. JOSEPH, MISSOURI.

BRAKE.

No. 846,457.   Specification of Letters Patent.   Patented March 12, 1907.

Application filed April 30, 1906. Serial No. 314,495.

*To all whom it may concern:*

Be it known that I, HENRY J. DOHRER, a citizen of the United States, residing at St. Joseph, in the county of Buchanan and State of Missouri, have invented certain new and useful Improvements in Vehicle-Brakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my device is to provide an improved brake that will hold the vehicle-wheels to which applied to any desired tension, that can be manipulated by either hand or foot, and that is equally adapted for use with heavy wagons and light vehicles, including automobiles and other conveyances with rubber tires.

I accomplish my object by the mechanism illustrated by the accompanying drawings, in which—

Figure 1 is a section elevation of the device attached on the front of a vehicle-axle, the parts of the mechanism in the position occupied when the brake is out of gear. Fig. 2 is a corresponding view showing the position of the several parts when the brake is set. Fig. 3 is a plan of the device as it appears from underneath. Fig. 4 is a detail cross-section of an eccentric-rod, a yoke, and set-screw, a round bar, compression-plates thereon, and boxing. Fig. 5 illustrates a manner in which the brake may be attached to a vehicle, and Fig. 6 is a detail of compression-plates of the device.

Similar letters refer to similar parts in the several views. These parts consist of a geared wheel A, attached to the inside of the spokes of a wheel B.

B' B' are connections between the frame and axle.

A solid round bar C has a pinion C' attached on its outer end. This bar is surrounded by compression-plates D D'. When this bar is tightly compressed by said plates, the plates are slightly spaced apart, as shown in Fig. 4. Said plates are held in a boxing E, which is open at top and bottom, its ends circular and provided with openings serving as bearings for said bar C. An eccentric F, carried by eccentric-rod F', constructed in the shape shown in Fig. 4, is adapted to work in valley $d$ of compression-plate D. Duplicate yokes H H surround the boxing, the lower part of compression-plate D', and eccentric-rod F'.

I is a frame for holding all the mechanism hereinbefore described, except gear-wheel A, and to which boxing E is pivoted by pin $e$ at its inner end. This frame is rigidly attached to axle I' of the vehicle.

A conveyer J is supported by bar C and provided with a slotted arm J', which is guided through its slot by a screw K, which is held securely in the frame. A lifter L is rigidly attached at one end to eccentric-rod F', its outer end perforated to receive a slightly-curved pin M, the lower end of which pin is connected with slotted arm J'. A spiral spring O engages with said pin, acting between the end of lifter L and a cap P on the top of said pin. R R are set-screws for taking up the wear on bar C and plates D D'. S is the brake-lever, S' the brake-rod, and $S^2$ the brake-handle. The pinion being out of mesh with the gear, the initial movement of the lever elevates said lifter L, which, through engagement with pin M, draws slotted arm J' of conveyer J upward, thereby throwing pinion C' into mesh with gear-wheel A. A further forward movement of the lever causes eccentric F to act on compression-plate D, at the same time drawing yokes H H upward, thereby clamping compression-plates D D' on bar C and stopping the vehicle or regulating its speed.

While my device is described in its operation on one wheel only, it should be understood that it is used with two opposite wheels, the devices having any suitable eccentric-rod connection.

What I claim, and desire to secure by Letters Patent, is—

1. In a vehicle-brake the combination with a geared wheel attached to the inside of the spokes of a wheel and spaced from and surrounding the wheel-hub, a round bar and the pinion at the outer end thereof, of compression-plates, the lower one round at the bottom, the upper one having a valley in the top the interior of each being semicircular, boxing therefor, duplicate yokes, their set-screws, an eccentric and eccentric-rod, a lever, a conveyer and a slotted arm thereon, a pin, its lower end fastened therein and a spring and cap carried thereby, a lifter rigidly fastened to the eccentric-rod engaging with said pin and spring, a frame rigidly attached to the axle, and all necessary supports, substantially as set forth and shown.

2. In a vehicle-brake the combination with a lever and frame, a round bar, pinion and gear-wheel, of an eccentric and eccentric-rod, spaced compression-plates adapted to grip said round bar the upper one provided with a valley for engagement with the eccentric, a conveyer, a slotted arm thereon and its guide-screw, a curved pin attached to the top of said arm, a spiral spring and cap on said pin and a lifter carried on said eccentric-rod and adapted to engage with said pin and elevate the slotted arm of the conveyer, substantially as set forth and shown.

3. The combination with a vehicle-brake provided with a pinion-bar, of an eccentric and eccentric-rod, a lifter carried by said eccentric-rod, a conveyer carried thereon, a slotted conveyer-arm, a curved pin on said pinion-bar and its spring and cap, adapted to engage with said lifter, substantially as described.

4. In a vehicle-brake the combination with the cogs of a casting carried by the spokes of a wheel spaced from the hub of the wheel and a bar and the pinion thereon, of a lower compression-plate rounded at the bottom, an upper compression-plate provided with a valley in the top, said compression-plates being adapted to engage with said pinion-bar, an eccentric operating in said valley, an eccentric-rod, a lever engaging with the eccentric-rod, a frame, duplicate yokes inclosing said compression-plates and boxing and bar, and set-screws to take up wear, substantially as shown and set forth.

In testimony whereof I affix my signature in presence of two witnesses.

HENRY J. DOHRER.

Witnesses:
 ED. G. SCHWERS,
 HARRY L. PUTMAN.